L. O. GRONDAHL AND A. H. PFUND.
COVER FOR HEADLIGHTS.
APPLICATION FILED OCT. 29, 1917.
1,350,277.  Patented Aug. 17, 1920.
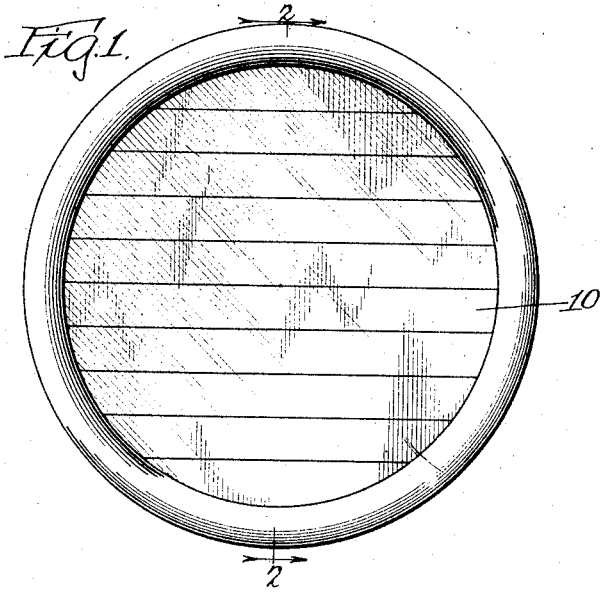
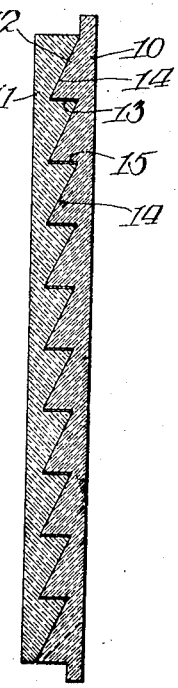
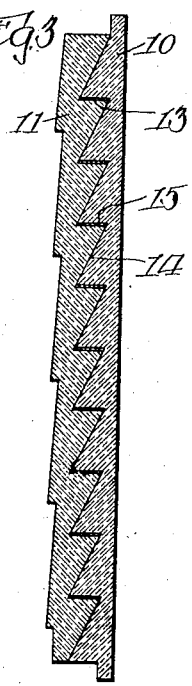
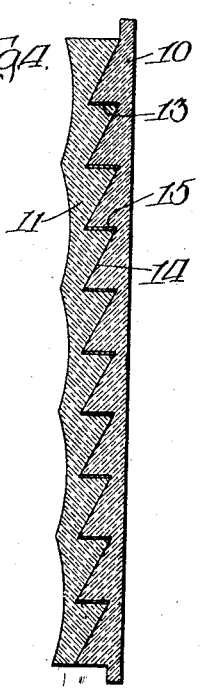
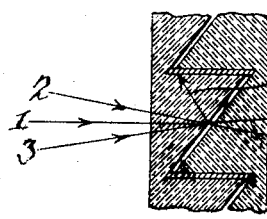
Inventors.
Lars O. Grondahl
and August H. Pfund
By Harry Lea Dodson.
Atty.

UNITED STATES PATENT OFFICE.

LARS O. GRONDAHL, OF PITTSBURGH, PENNSYLVANIA, AND AUGUST H. PFUND, OF BALTIMORE, MARYLAND.

COVER FOR HEADLIGHTS.

1,350,277. Specification of Letters Patent. Patented Aug. 17, 1920.

Application filed October 29, 1917. Serial No. 198,983.

*To all whom it may concern:*

Be it known that we, LARS O. GRONDAHL and AUGUST H. PFUND, citizens of the United States, residing, respectively, at Pittsburgh, in the county of Allegheny and State of Pennsylvania, and at Baltimore, State of Maryland, have invented a certain new and useful Improvement in Covers for Headlights, of which the following is a specification.

This invention relates to cover glasses adapted for use in automobiles, and other headlights, and has for its object to provide a maximum amount or intensity of light, and yet to so deflect and distribute all of the rays of the light as to cause them to be projected downwardly and forwardly, the upper light rays not being elevated above the horizontal.

Our invention consists of certain details of construction hereinafter set forth and pointed out in our claims, and illustrated in the accompanying drawing, in which:

Figure 1 is a face view of our improved cover glass for vehicle headlights.

Figs. 2, 3 and 4 are sectional views of the same.

Fig. 5 shows the course of the rays; ray 1, meets the air film at the angle of incidence equal to the critical angle; ray 2, meets the air film at the angle of incidence smaller than the critical angle, and passes through, and ray 3, meets the air film at the angle of incidence greater than the critical angle, and suffers total internal reflection.

Referring to the accompanying drawings, reference numeral 10, is used to indicate one of the two pieces of glass which we use to produce the object which we seek, our cover glass being comprised of two pieces of glass pressed and put together, as clearly shown in the drawings, and the numeral 11, indicates the companion glass. The glass 10, is so molded that on its inner surface, it is provided with a series of evenly spaced prismatic projections, the upper surfaces of the projections pointing inwardly and downwardly, as shown. The lower surfaces of the prismatic projections are horizontal, or inclined slightly downward away from the source of light. The numeral 12, indicates the upper downwardly and inwardly inclining surface of the respective prismatic projections, and the numeral 13, indicates the lower surface thereof.

The companion glass 11, is provided on its forward surface with a plurality of inclined prismatic projections to mate with their respective inclined surfaces on the glass 10, as is clearly shown in the drawings. The prismatic projections of the glass 10, are obviously comprised of two surfaces, the sloping surface 14, and the horizontal, of a slightly outwardly and upwardly inclined surface 15.

The effect of this construction is to provide a two-piece glass cover, the pieces being so constructed and fitted together, as to provide reflecting surfaces, adapted to receive and deliver the rays of light so as to produce the object sought.

In fitting the two pieces of glass together, they may be held rigidly in position by any of the ordinary means, or they may be cemented together with an opaque substance, such cement only being applied to the surfaces of the prismatic projections which assume the horizontal, or practically horizontal.

In practical operation, our cover glass receives the rays of light from the source and delivers them in the following manner: The rays which come directly from the lamp and the reflector which strike the inclined and mated surfaces between the two pieces of glass at or below a plane horizontal to the light source are deflected from their course, when they pass through the air space between the two pieces of glass, while all the rays of light which strike the inclined or deflecting surfaces above the horizontal, will be totally reflected by these inclined projecting surfaces, to the surfaces thereof which are practically horizontal, and will be completely absorbed thereby, so that the beam suffers total internal reflection. Therefore all upward rays suffer total internal reflection and are absorbed by opaque material. In the form shown in Fig. 2, they leave the glass in the same direction at which they enter it. Thus it will be observed that no direct or reflected rays of light striking the cover glass at an upward angle will be permitted to proceed therethrough, so that all of the light, coming from a headlight provided with our cover glass, will not have any direct rays emanating therefrom above a plane horizontal with the source. As it is a well established fact that the rays of light which come direct from a reflected surface are the rays that cause the glare, it is obvious that by the use of our cover glass we will have entirely eliminated all of the light rays that would cause a glare in the eyes of pedestrians or approaching drivers.

Figs. 3 and 4 show modified forms of our device, the rear surface of the glass 11, being provided with other reflecting angles, as shown, or with vertical cylindrical surfaces, the purpose of these surfaces being to produce such distribution of the light as may be desirable, without altering or affecting the operation of the interfitting mated reflecting surfaces hereinbefore described.

Having thus described our invention, what we regard as new and desire to secure by Letters Patent of the United States, is:

1. A cover for headlights comprising two mating pieces of glass fitted together, each of the mating surfaces being provided with prismatic projections fitted together, one set of faces of the prismatic projections sloping rearwardly at an angle with the vertical, the other set of faces sloping slightly downwardly and inwardly from the horizontal.

2. A cover for headlights comprising two mating pieces of glass locked together, each of the mating surfaces being provided with prismatic projections fitted together, one set of faces of the prismatic projections sloping rearwardly at an angle with the vertical, the other set of faces being substantially horizontal, and an opaque substance between the faces that are substantially horizontal.

3. A cover for headlights comprising two mating pieces of glass locked together, each of the mating surfaces being provided with prismatic projections fitted together, the rear surface of the rear piece of glass being provided with additional prismatic surfaces for the purpose set forth substantially as described.

In testimony whereof, we have signed the foregoing specification.

LARS O. GRONDAHL.
AUGUST H. PFUND.